United States Patent [19]
Hanson et al.

[11] Patent Number: 5,955,953
[45] Date of Patent: Sep. 21, 1999

[54] PET IDENTIFIER

[76] Inventors: Michael C. Hanson; Mark W. Sharp, both of 2 Waterford Professional Center Suite 6E, York, Pa. 17402

[21] Appl. No.: 09/109,708

[22] Filed: Jul. 2, 1998

[51] Int. Cl.[6] .................................................. G08B 23/00
[52] U.S. Cl. ..................................... 340/573.3; 340/573.1; 340/691.6
[58] Field of Search ............................. 340/573.3, 573.1, 340/573.4, 573.2, 691.6; 119/858

[56] References Cited

U.S. PATENT DOCUMENTS

| | | | |
|---|---|---|---|
| 5,012,229 | 4/1991 | Lennon et al. | 340/706 |
| 5,036,610 | 8/1991 | Fehr | 40/300 |
| 5,355,839 | 10/1994 | Mistry | 119/858 |
| 5,454,350 | 10/1995 | Betheil | 119/858 |
| 5,515,033 | 5/1996 | Matarazzo | 340/573 |
| 5,603,094 | 2/1997 | Greear, Jr. | 455/66 |

*Primary Examiner*—Daniel J. Wu
*Assistant Examiner*—Toan N. Pham

[57] ABSTRACT

An article to be worn with an identification unit mounted thereon. The identification unit includes a speaker for transmitting audio signals via free space upon the receipt thereof. Further included is a message playback switch for transmitting a playback signal and a message record switch for transmitting a record signal. The identification unit further includes a sound module adapted to store an audio message including a name of the pet and at least one of an address and a phone number upon the receipt of the record signal. The sound module further serves to playback the audio message upon the receipt of the playback signal.

6 Claims, 3 Drawing Sheets

PET IDENTIFIER

BACKGROUND OF THE INVENTION

1. Field of the Invention

The present invention relates to pet collars and more particularly pertains to a new pet identifier for identifying a pet with audible and visual information.

2. Description of the Prior Art

The use of pet collars is known in the prior art. More specifically, pet collars heretofore devised and utilized are known to consist basically of familiar, expected and obvious structural configurations, notwithstanding the myriad of designs encompassed by the crowded prior art which have been developed for the fulfillment of countless objectives and requirements.

Known prior art pet collars include U.S. Pat. No. 3,585,743; U.S. Pat. No. 5,257,011; U.S. Pat. No. 3,231,992; U.S. Pat. No. 4,005,388; U.S. Pat. Des. No. 299,235; and U.S. Pat. No. 2,054,227.

In these respects, the pet identifier according to the present invention substantially departs from the conventional concepts and designs of the prior art, and in so doing provides an apparatus primarily developed for the purpose of identifying a pet with audible and visual information.

SUMMARY OF THE INVENTION

In view of the foregoing disadvantages inherent in the known types of pet collars now present in the prior art, the present invention provides a new pet identifier construction wherein the same can be utilized for identifying a pet with audible and visual information.

The general purpose of the present invention, which will be described subsequently in greater detail, is to provide a new pet identifier apparatus and method which has many of the advantages of the pet collars mentioned heretofore and many novel features that result in a new pet identifier which is not anticipated, rendered obvious, suggested, or even implied by any of the prior art pet collars, either alone or in any combination thereof.

To attain this, the present invention generally comprises a leather collar with a planar rectangular configuration. The collar has a first end with a buckle mounted thereon. Associated therewith is a second end with a plurality of linearly aligned apertures for coupling with the buckle. By this structure, the collar may be mounted about a neck of a pet. The collar further includes a pair of apertures formed in a central extent thereof along a longitudinal center line of the collar for reasons that will soon become apparent. As shown in FIG. 3, a resilient base plate is provided with a planar rectangular configuration. The base plate preferably has a width equal to that of the collar and a length about ¼ that of the collar. Further, the resilient base plate includes a pair of apertures formed therein. Next provided is an identification unit including a housing with a generally planar rectangular configuration. Such housing is equipped with a bottom face having a width equal to that of the collar and a length about ¼ that of the collar. The housing further has a top face and a thin periphery formed therebetween. As shown in FIG. 3, the bottom face has a pair of threaded recesses formed therein. By this feature, the base plate and housing may be mounted to opposite sides of the collar via a pair of screws situated through the apertures and engaged with the threaded recesses. With reference still to FIG. 3, it is shown that the bottom face further includes a recessed battery compartment with a removable cover for housing at least one battery. The identification unit further includes a liquid crystal display mounted on the top face of the housing. Ideally, the display has an area at least ¾ that of the top face of the housing. In use, the liquid crystal display serves to display a name of the pet, an address of an owner of the pet, and a phone number of the owner. Such information is depicted for a predetermined amount of time only upon the receipt of an activation signal. Mounted on the top face of the housing to a first side of the display is a speaker for transmitting audio signals via free space upon the receipt thereof. Also included is a voice activated switch situated within the housing and connected to a microphone mounted on the top face of the housing to the first side of the display. The voice activated switch is adapted to transmit a playback signal upon the receipt of an audio signal via the microphone with a magnitude which exceeds a predetermined amount. As best shown in FIG. 6, the identification unit further has a message playback push button momentary switch mounted on the top face of the housing. The present switch serves for transmitting the playback signal upon the depression thereof. Associated therewith is a message record push button momentary switch for transmitting a record signal upon the depression thereof. Finally, a sound module is positioned within the housing and connected to the display, voice activated switch, message playback push button momentary switch, and message record push button momentary switch. During operation, the sound module is adapted to store an audio message including the name of the pet, the address, and the phone number via the microphone upon the receipt of the record signal. Further, the sound module further serves to playback the audio message and transmit the activation signal to the display upon the receipt of the playback signal.

There has thus been outlined, rather broadly, the more important features of the invention in order that the detailed description thereof that follows may be better understood, and in order that the present contribution to the art may be better appreciated. There are additional features of the invention that will be described hereinafter and which will form the subject matter of the claims appended hereto.

In this respect, before explaining at least one embodiment of the invention in detail, it is to be understood that the invention is not limited in its application to the details of construction and to the arrangements of the components set forth in the following description or illustrated in the drawings. The invention is capable of other embodiments and of being practiced and carried out in various ways. Also, it is to be understood that the phraseology and terminology employed herein are for the purpose of description and should not be regarded as limiting.

As such, those skilled in the art will appreciate that the conception, upon which this disclosure is based, may readily be utilized as a basis for the designing of other structures, methods and systems for carrying out the several purposes of the present invention. It is important, therefore, that the claims be regarded as including such equivalent constructions insofar as they do not depart from the spirit and scope of the present invention.

Further, the purpose of the foregoing abstract is to enable the U.S. Patent and Trademark Office and the public generally, and especially the scientists, engineers and practitioners in the art who are not familiar with patent or legal terms or phraseology, to determine quickly from a cursory inspection the nature and essence of the technical disclosure of the application. The abstract is neither intended to define the invention of the application, which is measured by the claims, nor is it intended to be limiting as to the scope of the invention in any way.

It is therefore an object of the present invention to provide a new pet identifier apparatus and method which has many of the advantages of the pet collars mentioned heretofore and many novel features that result in a new pet identifier which is not anticipated, rendered obvious, suggested, or even implied by any of the prior art pet collars, either alone or in any combination thereof.

It is another object of the present invention to provide a new pet identifier which may be easily and efficiently manufactured and marketed.

It is a further object of the present invention to provide a new pet identifier which is of a durable and reliable construction.

An even further object of the present invention is to provide a new pet identifier which is susceptible of a low cost of manufacture with regard to both materials and labor, and which accordingly is then susceptible of low prices of sale to the consuming public, thereby making such pet identifier economically available to the buying public.

Still yet another object of the present invention is to provide a new pet identifier which provides in the apparatuses and methods of the prior art some of the advantages thereof, while simultaneously overcoming some of the disadvantages normally associated therewith.

Still another object of the present invention is to provide a new pet identifier for identifying a pet with audible and visual information.

Even still another object of the present invention is to provide a new pet identifier that includes an identification unit mounted thereon. The identification unit includes a speaker for transmitting audio signals via free space upon the receipt thereof. Further included is a message playback switch for transmitting a playback signal and a message record switch for transmitting a record signal. The identification unit further includes a sound module adapted to store an audio message including a name of the pet and at least one of an address and a phone number upon the receipt of the record signal. The sound module further serves to playback the audio message upon the receipt of the playback signal.

These together with other objects of the invention, along with the various features of novelty which characterize the invention, are pointed out with particularity in the claims annexed to and forming a part of this disclosure. For a better understanding of the invention, its operating advantages and the specific objects attained by its uses, reference should be made to the accompanying drawings and descriptive matter in which there are illustrated preferred embodiments of the invention.

BRIEF DESCRIPTION OF THE DRAWINGS

The invention will be better understood and objects other than those set forth above will become apparent when consideration is given to the following detailed description thereof. Such description makes reference to the annexed drawings wherein.

DESCRIPTION OF THE PREFERRED EMBODIMENT

Figure 1:
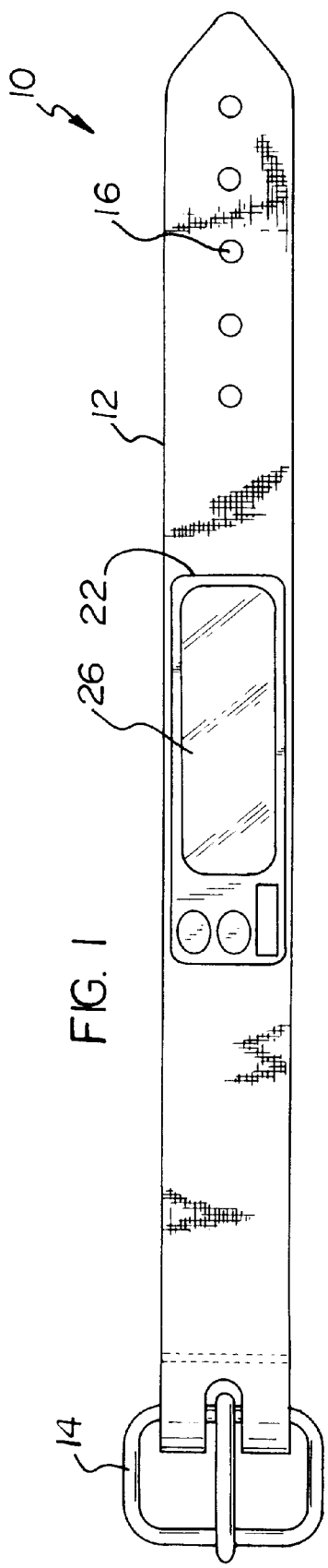
FIG. 1 is a front view of a new pet identifier according to the present invention.
Figure 2:
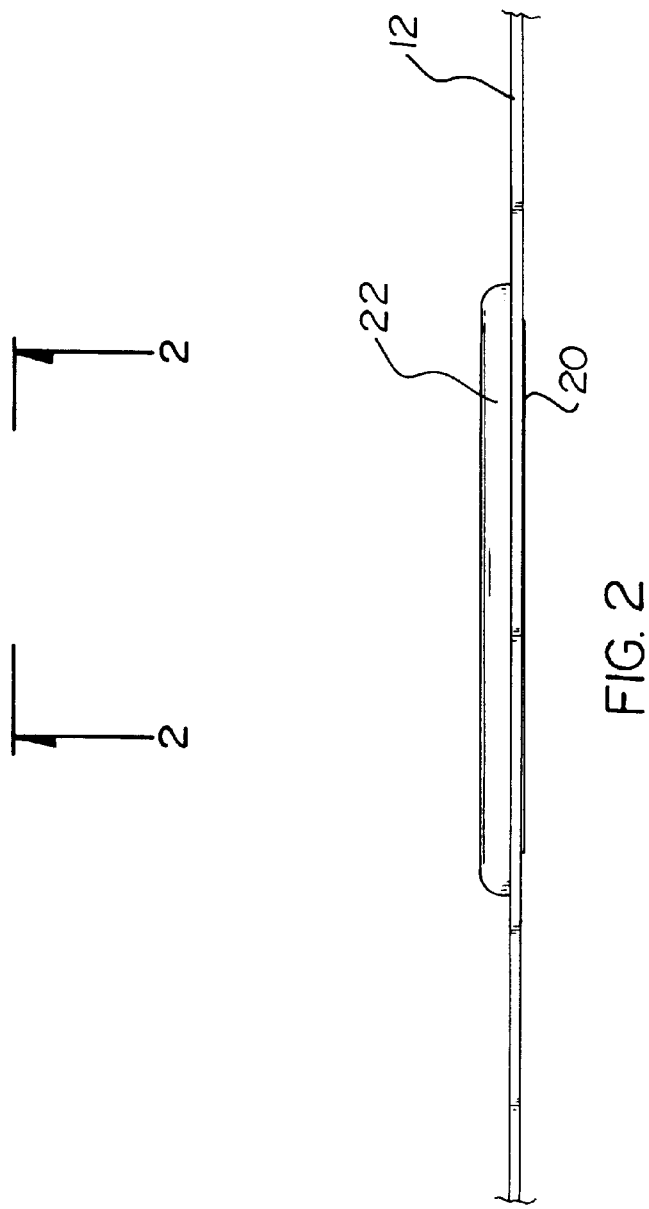
FIG. 2 is a side view of the present invention.

With reference now to the drawings, and in particular to FIGS. 1 through 6 thereof, a new pet identifier embodying the principles and concepts of the present invention and generally designated by the reference numeral 10 will be described.

The present invention, designated as numeral 10, includes a leather collar 12 with a planar rectangular configuration. The collar has a first end with a buckle 14 mounted thereon. Associated therewith is a second end with a plurality of linearly aligned apertures 16 for coupling with the buckle. By this structure, the collar may be mounted about a neck of a pet. The collar further includes a pair of apertures 18 formed in a central extent thereof along a longitudinal center line of the collar for reasons, that will soon become apparent.

Figure 3:
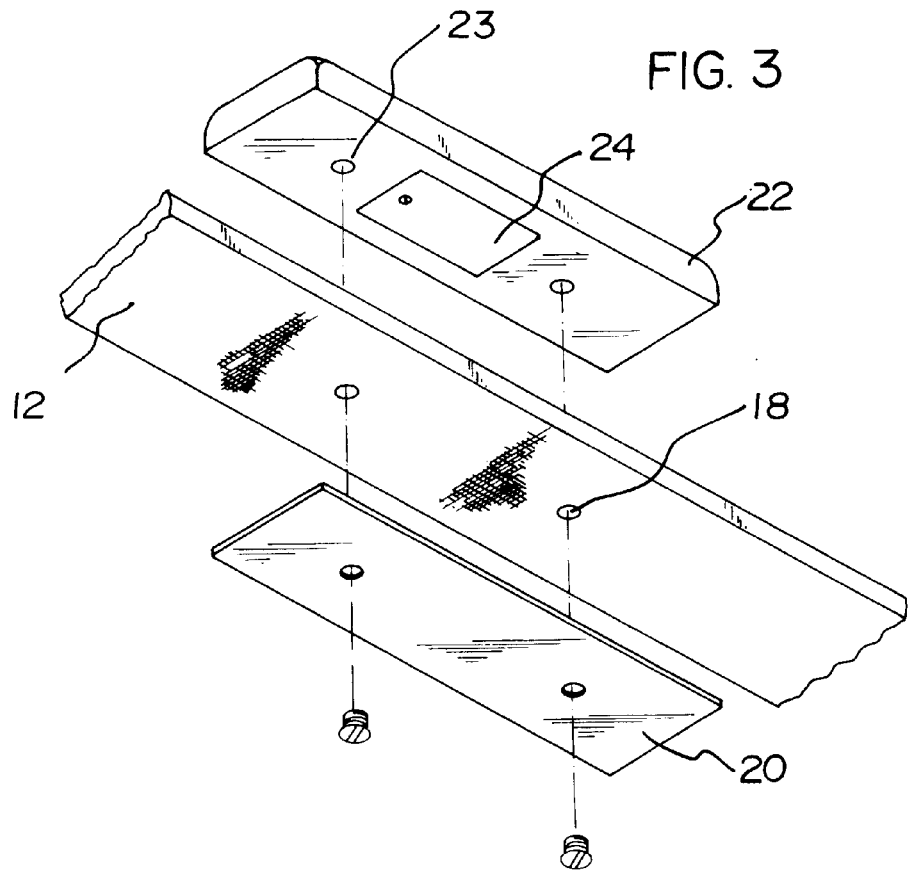
FIG. 3 is an exploded perspective view of the present invention.
Figure 4:
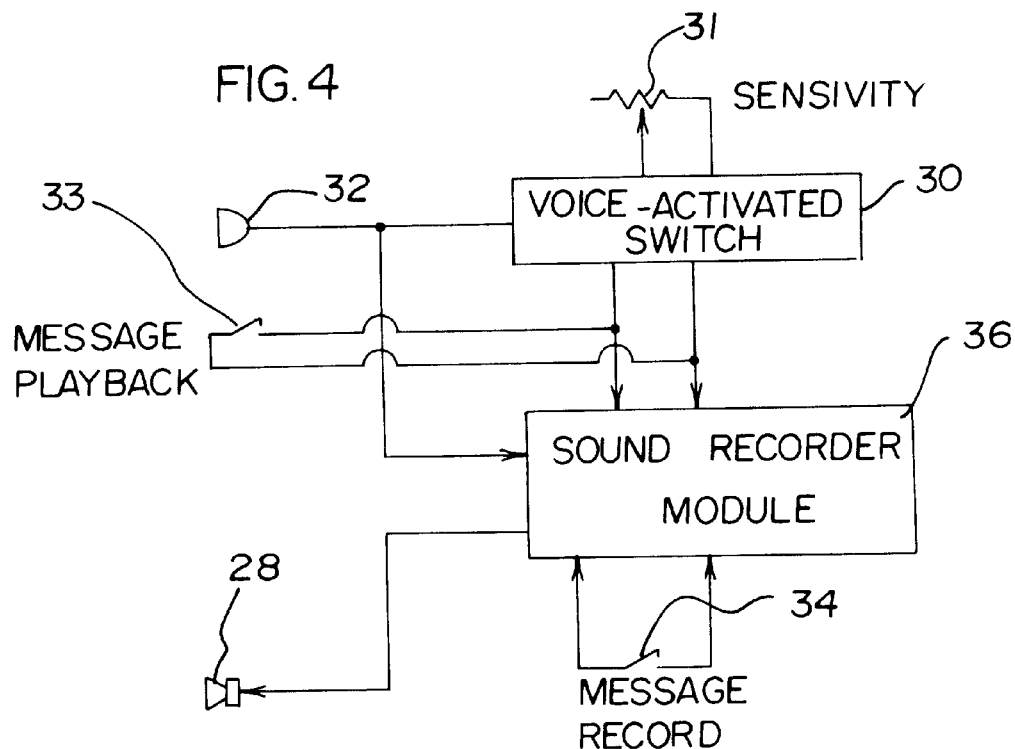
FIG. 4 is a schematic diagram of the present invention.
Figure 5:
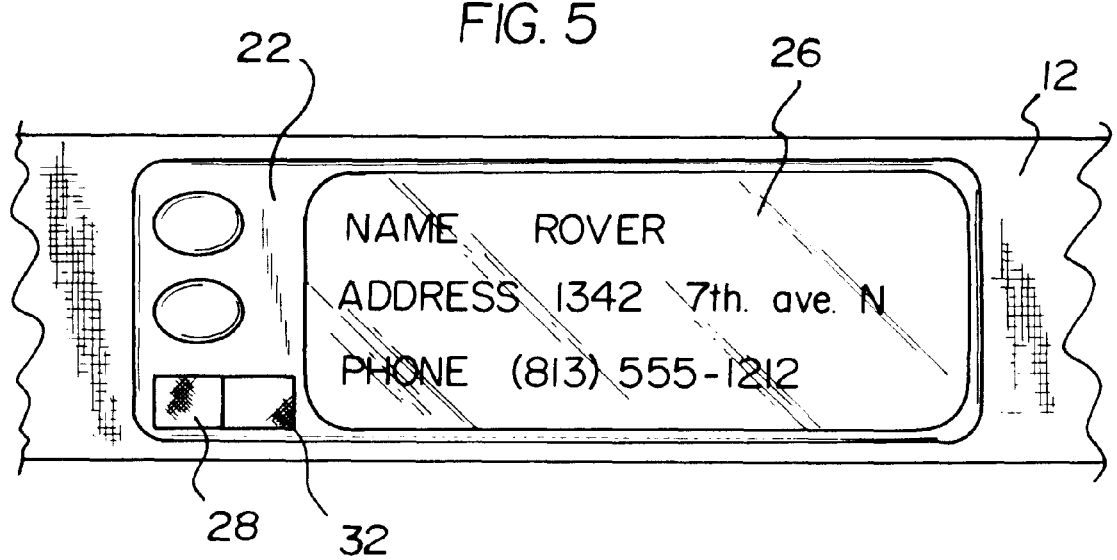
FIG. 5 is a detailed front view of the identification unit of the present invention.

As shown in FIG. 3, a resilient plastic base plate 20 is provided with a planar rectangular configuration. The base plate preferably has a width equal to that of the collar and a length about ¼ that of the collar. Further, the resilient base plate includes a pair of apertures formed therein.

Next provided is an identification unit including a housing 22 with a generally planar rectangular configuration. Such housing is equipped with a bottom face having a width equal to that of the collar and a length about ¼ that of the collar. The housing further has a top face and a thin periphery formed therebetween. As shown in FIG. 3, the bottom face has a pair of threaded recesses 23 formed therein.

By this feature, the base plate and housing may be mounted to opposite sides of the collar via a pair of screws situated through the apertures and engaged with the threaded recesses. With reference still to FIG. 3, it is shown that the bottom face of the housing further includes a recessed battery compartment 24 with a removable cover for containing at least one battery. Ideally, a watch battery or other type of miniature battery is employed for powering purposes.

The identification unit further includes a liquid crystal display 26 mounted on the top face of the housing. Ideally, the display has an area at least ¾ that of the top face of the housing. In use, the liquid crystal display serves to display a name of the pet, an address of an owner of the pet, a phone number of the owner and/or any other relevant information. Such information is depicted for a predetermined amount of time only upon the receipt of an activation signal. Alternatively, the display may depict the information on a continuous basis.

It should be readily apparent that any type of appropriate memory and a timer may be employed for accomplishing the foregoing tasks associated with the display. Per the desires of the user, the memory associated with the display may be filled with the appropriate information by the manufacture or, in the alternative, a dedicated entry keypad may be included for accomplishing the same. As an option, the switches of the present invention may be used in a predetermined manner to enter the information.

Mounted on the top face of the housing to a first side of the display is a speaker 28 for transmitting audio signals via free space upon the receipt thereof. Also included is a voice activated switch 30 situated within the housing and connected to a microphone 32 mounted on the top face of the housing to the first side of the display. The voice activated switch is adapted to transmit a playback signal upon the receipt of an audio signal via the microphone with a magnitude which exceeds a predetermined amount. Such predetermined switch may be set by the user via an optional sensitivity switch 31.

Figure 6:
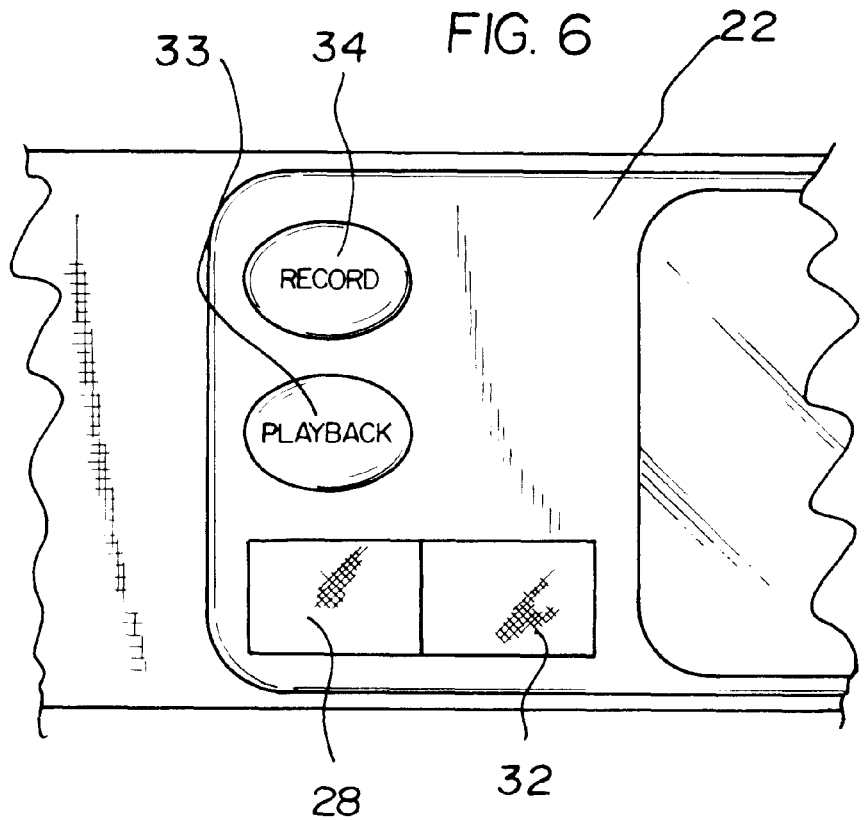
FIG. 6 is a detailed view of the buttons of the identification unit shown in FIG. 5.

As best shown in FIG. 6, the identification unit further has a message playback push button momentary switch 33 mounted on the top face of the housing to the first side of the display. The present switch serves for transmitting the playback signal upon the depression thereof. Associated therewith is a message record push button momentary switch 34 for transmitting a record signal upon the depression thereof.

Finally, a sound module 36 is positioned within the housing and connected to the display, voice activated switch, message playback push button momentary switch, and message record push button momentary switch. During operation, the sound module is adapted to store an audio message including the name of the pet, the address, and the phone number via the microphone upon the receipt of the record signal. Further, the sound module further serves to playback the audio message and transmit the activation signal to the display upon the receipt of the playback signal. Digital memory is preferably employed by the sound module for accomplishing the foregoing function.

The present invention thus provides both visual and audible information regarding a pet upon either a depression of a button or the detection of an audible sound. With this information, the pet may be readily returned to the owner. It should be noted that the present invention further has other applications including, but not limited to, children and people inflicted with various illnesses.

As to a further discussion of the manner of usage and operation of the present invention, the same should be apparent from the above description. Accordingly, no further discussion relating to the manner of usage and operation will be provided.

With respect to the above description then, it is to be realized that the optimum dimensional relationships for the parts of the invention, to include variations in size, materials, shape, form, function and manner of operation, assembly and use, are deemed readily apparent and obvious to one skilled in the art, and all equivalent relationships to those illustrated in the drawings and described in the specification are intended to be encompassed by the present invention.

Therefore, the foregoing is considered as illustrative only of the principles of the invention. Further, since numerous modifications and changes will readily occur to those skilled in the art, it is not desired to limit the invention to the exact construction and operation shown and described, and accordingly, all suitable modifications and equivalents may be resorted to, falling within the scope of the invention.

We claim:

1. A pet identification collar comprising, in combination:
   a collar with an elongate rectangular configuration having a first end with a buckle mounted thereon and a second end with a plurality of linearly aligned apertures for coupling with the buckle such that the collar may be mounted about a neck of a pet, the collar further including a pair of apertures formed in a central extent thereof along a longitudinal center line of the collar;
   a resilient base plate with a planar rectangular configuration having a width substantially equal to that of the collar and a length about ¼ that of the collar, the resilient base plate including a pair of apertures formed therein; and
   an identification unit including a housing with a generally planar rectangular configuration formed of a bottom face with a width equal to that of the collar and a length about ¼ that of the collar, a top face, and a thin periphery formed therebetween, the bottom face having a pair of threaded recesses formed therein, wherein the base plate and housing are mounted to opposite sides of the collar via a pair of screws extending through the apertures and being engaged with the threaded recesses, the bottom face further including a recessed battery compartment with a removable cover for housing at least one battery, the identification unit further including:
   a liquid crystal display mounted on the top face of the housing with an area at least ¾ that of the top face of the housing, the liquid crystal display adapted to display a name of the pet, an address of an owner of the pet, and a phone number of the owner for a predetermined amount of time only upon the receipt of an activation signal,
   a speaker mounted on the top face of the housing to a first side of the display for transmitting audio signals via free space upon the receipt of audio signals,
   a voice activated switch situated within the housing and connected to a microphone mounted on the top face of the housing to the first side of the display, the voice activated switch being mounted adjacent to the speaker, the voice activated switch adapted to transmit a playback signal upon the receipt of an audio signal via the microphone with a magnitude which exceeds a predetermined amount,
   a message playback push button momentary switch mounted on the top face of the housing for transmitting the playback signal upon the depression thereof, the message playback button having an oval periphery, a top surface of the message playback button being mounted substantially flush with the top face of the housing,
   a message record push button momentary switch mounted on the top face of the housing for transmitting a record signal upon the depression thereof, the message record button having an oval shaped periphery, a top surface of the message record button being mounted substantially flush with the top face of the housing, and
   a sound module positioned within the housing and connected to the display, voice activated switch, message playback push button momentary switch, and message record push button momentary switch, the sound module adapted to store an audio message including the name of the pet, the address, and the phone number via the microphone upon the receipt of the record signal, the sound module further adapted to playback the audio message and transmit the activation signal to the display upon the receipt of the playback signal from the voice activated switch or the message playback push button momentary switch.

2. An identification unit comprising:
   an article to be worn, the article comprising a securing means and a buckle, the securing means having a planar rectangular configuration, a first end, and a second end, the first end having a plurality of linearly aligned apertures, the buckle being mounted to the second end, wherein the article being of a sufficient length to traverse the circumference around the area body where the article is to be worn; and
   an identification unit including a housing securely mounted on the article and including a speaker situated in the housing for transmitting audio signals via free space upon the receipt thereof, a message playback switch situated in the housing for transmitting a playback signal, a message record switch situated in the housing for transmitting a record signal, a display situated in the housing adapted to depict a name of the pet and at least one of an address and a phone number upon the receipt of the playback signal, and a sound module situated in the housing adapted to store an audio message including the name of the pet and at least one of the address and the phone number upon the receipt of the record signal, the sound module further adapted to playback the audio message from the speaker situated in the housing upon the receipt of the playback signal.

3. An identification unit as set forth in claim 2 and further including a voice activated switch situated in the housing adapted to transmit the playback signal to the sound module upon the receipt of an audio signal with a magnitude which exceeds a predetermined amount.

4. An identification unit comprising:

an article to be worn, the article comprising a securing means and a buckle, the securing means having a planar rectangular configuration, a first end, and a second end, the first end having a plurality of linearly aligned apertures, the buckle being mounted to the second end, wherein the article being of a sufficient length to traverse the circumference around the area body where the article is to be worn; and a display mounted in a housing on the article and adapted to depict a name of the pet and at least one of an address and a phone number upon receipt of an actuation signal, a voice activated switch situated in the housing adapted to emit the actuation signal upon the receipt of an audio signal with a magnitude which exceeds a predetermined amount, a sound module situated in the housing and adapted to playback a prerecorded audio message from a speaker in the housing upon receipt of the actuation signal.

5. An identification unit as set forth in claim 4 and further including a push button switch for actuating the display upon the depression thereof.

6. An identification unit as set forth in claim 4 wherein the display is continuously actuated.

* * * * *